US012799025B2

(12) United States Patent
Leukel et al.

(10) Patent No.: US 12,799,025 B2
(45) Date of Patent: Nov. 17, 2026

(54) CHEMICALLY TEMPERED GLASS OR GLASS-CERAMIC ARTICLE IN PANE FORM FOR USE AS COVER PANE, PROCESS FOR PRODUCTION THEREOF AND USE THEREOF

(71) Applicants: Schott AG, Mainz (DE); SCHOTT Technical Glass Solutions GmbH, Jena (DE)

(72) Inventors: Sebastian Leukel, Mainz (DE); Lars Müller, Mainz (DE); Patrick Wilde, Mainz (DE); Karin Wieligmann, Jena (DE); Eric Oberländer, Jena (DE)

(73) Assignees: SCHOTT AG, Mainz (DE); SCHOTT Technical Glass Solutions GmbH, Jena (DE)

( * ) Notice: Subject to any disclaimer, the term of this patent is extended or adjusted under 35 U.S.C. 154(b) by 134 days.

(21) Appl. No.: 18/672,782

(22) Filed: May 23, 2024

(65) Prior Publication Data

US 2024/0391825 A1 Nov. 28, 2024

(30) Foreign Application Priority Data

May 23, 2023 (DE) .................... 10 2023 113 453.1

(51) Int. Cl.
*C03C 21/00* (2006.01)
*C03C 3/097* (2006.01)
*C03C 10/00* (2006.01)

(52) U.S. Cl.
CPC ............ *C03C 21/002* (2013.01); *C03C 3/097* (2013.01); *C03C 10/0027* (2013.01); *C03C 10/0054* (2013.01); *C03C 2204/00* (2013.01)

(58) Field of Classification Search
USPC ........................................................ 428/220
See application file for complete search history.

(56) References Cited

U.S. PATENT DOCUMENTS 10,405,379 B2 9/2019 Lestringant et al.
11,339,082 B2 5/2022 Dietrich et al.
(Continued)

FOREIGN PATENT DOCUMENTS

CN 110482855 A * 11/2019 ............ C03C 3/097
CN 111116040 A 5/2020
(Continued)

OTHER PUBLICATIONS

ISO 6344-2, "Coated abrasives—Grain size analysis—Part 2: Determination of grain size distribution of macrogrits P12 to P220", Apr. 2000 (11 pages).

*Primary Examiner* — Ula C Ruddock
(74) *Attorney, Agent, or Firm* — TAYLOR & EDELSTEIN, PC

(57) ABSTRACT

A chemically tempered glass or glass-ceramic article in pane form for use as a cover pane includes a glass or glass-ceramic having a composition comprising the components $SiO_2$, $Al_2O_3$, $Li_2O$ and $Na_2O$, having a thickness d of 300 μm to 1000 μm, a compressive strength at a distance of 30 μm from a surface of a main face $CS_{30}$ of at least 60 MPa, and a compressive strength at a distance of 50 μm from the surface of a main face $CS_{50}$. The compressive strengths $CS_{30}$ and $CS_{50}$ of the same main face are in the following ratio V to one another:

$$V = \frac{CS_{30}}{CS_{50}} \leq -0.0006 * d + 2,$$

where d is the thickness of the article in μm.

11 Claims, 6 Drawing Sheets

(56) References Cited

U.S. PATENT DOCUMENTS

| | | | | |
|---|---|---|---|---|
| 2010/0009154 | A1 | 1/2010 | Allan et al. | |
| 2018/0305251 | A1 | 10/2018 | Ogami | |
| 2020/0002225 | A1 | 1/2020 | Schneider | |
| 2021/0292225 | A1 | 9/2021 | Umada et al. | |
| 2021/0317032 | A1 * | 10/2021 | Huang | C03C 10/0027 |

FOREIGN PATENT DOCUMENTS

| | | | | |
|---|---|---|---|---|
| EP | 2 819 966 | B1 | 8/2021 | |
| WO | 2016/070048 | A1 | 5/2016 | |
| WO | 2016/073539 | A1 | 5/2016 | |
| WO | 2017/177109 | A1 | 10/2017 | |
| WO | 2019/236975 | A2 | 12/2019 | |
| WO | 2020/261710 | A1 | 12/2020 | |
| WO | 2020/261711 | A1 | 12/2020 | |
| WO | WO-2022166028 | A1 * | 8/2022 | C03C 21/002 |

* cited by examiner

CHEMICALLY TEMPERED GLASS OR GLASS-CERAMIC ARTICLE IN PANE FORM FOR USE AS COVER PANE, PROCESS FOR PRODUCTION THEREOF AND USE THEREOF

CROSS REFERENCE TO RELATED APPLICATIONS

This application claims priority to German Patent Application No. 10 2023 113 453.1 filed on May 23, 2023, which is incorporated in its entirety herein by reference.

BACKGROUND OF THE INVENTION

1. Field of the Invention

The invention relates generally to glass or glass-ceramic articles for use as cover panes, especially as cover panes for electronic display devices. The invention further relates to a process for producing such an article and to the use thereof.

2. Description of the Related Art

Cover panes for electronic display devices, which are also referred to, for example, as covers (front covers or back covers) or cover panes, have already long been known, serve to cover electronic components beneath them and, especially as front cover, are also constructed as viewing pane, and nowadays generally in such a form that they comprise a chemically tempered glass or glass-ceramic pane. The glass or glass-ceramic pane usually has only a very low thickness of about 1 mm or less, since the weight of the display device equipped with such a cover pane (for example a smartphone or otherwise a wearable electronic device) is thus kept to a minimum.

Because it has only a very low thickness, the mechanical strength of the glass is reduced, and so, as indeed also already stated above, it is necessary to mechanically strengthen the glass by an appropriate treatment. In the case of the thin glasses from the prior art that have been addressed, this is effected in a chemical tempering process in which the glass pane is dipped into a dip bath comprising a salt melt. In the context of the present disclosure, the dip bath is also referred to synonymously as exchange bath, since ion exchange takes place on immersion into the bath comprising the salt melt.

In this way, smaller cations present in the glass of the glass pane are exchanged for the larger cations in the exchange bath. For example, it is known that sodium ions can be exchanged for potassium ions. Because of their size, the potassium ions create a compressive strength in the exchanged near-surface region of the glass pane, which is compensated for by a tensile strength within the glass pane. The overall result is thus an increase in the durability of the glass pane to mechanical stress.

It is likewise known that glass-ceramics can also be amenable to chemical tempering. The above-described exchange mechanism is also applicable in principle to glass-ceramics. Glass-ceramics in the context of the present disclosure are generally understood to mean materials that are based on a green glass and are subjected to a controlled or at least controllable crystallization so as to result in a microstructure comprising small crystals (or, synonymously, crystallites) having a quite homogeneous size distribution, where the crystals (or crystallites) do not exceed an average size of preferably 2 μm.

In a typical tempering profile, created by simple ion exchange, i.e. the exchange of a smaller cation, for example of $Na^+$, for a larger one, such as $K^+$, the tension falls significantly from the surface towards the interior of the glass or glass-ceramic article. This is critical specifically in the case of contact with blunt or smooth surfaces (what are called "blunt-impact stresses"), since these result in flexural stress that can lead to widening of lateral cracks and to mechanical failure of the cover pane under stress. The effect of rough surfaces and sharp articles can also constitute a problem. Moreover, there has been an increase in the demands made by the customer on the durability of mobile devices and their cover panes. Thus, such devices, in the event of incorrect handling, should withstand a fall from certain heights, for example not just onto a table but onto the ground, with minimum damage.

The prior art also already includes glass and glass-ceramic panes having tempering profiles created in a complex manner, for example from documents EP 2 819 966 B1, US 2020/0002225 A1 and US 2010/0009154 A1, US 2021/0292225 A1, CN111116040 A, WO 20261710 A1 and WO 20261711 A1, WO 16070048 A1, WO19236975 A2, WO 17177109 A1, WO 16073539 A1 and US20180305251 A1. However, a common factor to all of these is that they do not have sufficient strength for use.

SUMMARY OF THE INVENTION

Exemplary embodiments disclosed herein provide cover panes having elevated strength, i.e. cover panes where only very high loads in the case of stress lead to mechanical damage to the cover pane. Further aspects of the invention relate to a process for producing such a cover pane and to the use of such a cover pane.

In some embodiments disclosed herein, a chemically tempered glass or glass-ceramic article in pane form for use as a cover pane includes a glass or glass-ceramic having a composition comprising the components $SiO_2$, $Al_2O_3$, $Li_2O$ and $Na_2O$, having a thickness d of 300 μm to 1000 μm, a compressive strength at a distance of 30 μm from a surface of a main face $CS_{30}$ of at least 60 MPa, and a compressive strength at a distance of 50 μm from the surface of a main face $CS_{50}$. The compressive strengths $CS_{30}$ and $CS_{50}$ of the same main face are in the following ratio V to one another:

$$V = \frac{CS_{30}}{CS_{50}} \leq -0.0006 * d + 2,$$

where d is the thickness of the article in μm.

In some embodiments disclosed herein, a process for producing a glass or glass-ceramic article from a glass or glass-ceramic includes performing a plurality of ion exchanges of the glass or glass-ceramic including: a first ion exchange in a first exchange bath for a duration of 1 hour to 10 hours at a temperature between 380° C. and 460° C. in the case of a glass article and between 380° C. and 500° C. in the case of a glass-ceramic article, the first exchange bath having a composition between at least 0% by weight and at most 50% by weight of potassium salt and at most 100% by weight and at least 50% by weight of sodium salt; and a last ion exchange in a last exchange bath for a duration of 0.5 hour to 5 hours in the case of a glass article and of 0.2 hour to 5 hours in the case of a glass-ceramic article at a temperature between 380° C. and 460° C. in the case of a glass article and between 380° C. and 500° C. in the case of a glass-ceramic article, the last exchange bath having a composition between at least 50% by weight and at most 100% by weight of potassium salt and at most 50% by weight and at least 0% by weight of sodium salt.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
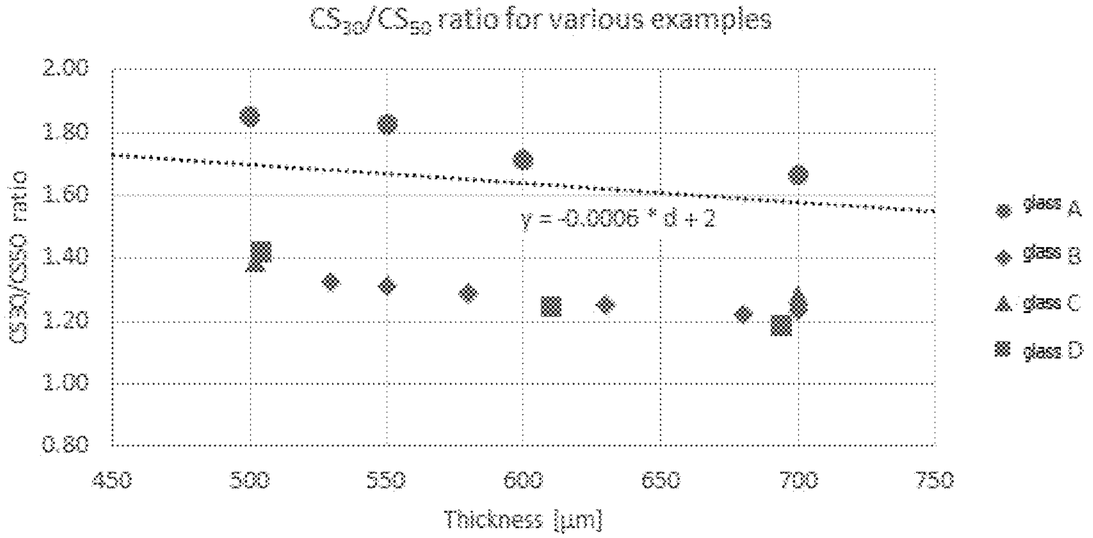
FIG. 1 shows data from Table 3 in the form of a graph, p on the x axis is the respective thickness of the glass samples in μm and plotted on the y axis is the respective ratio $$V = \frac{CS_{30}}{CS_{50}};$$

The invention relates to a glass or glass-ceramic article in pane form for use as cover pane, optionally front pane, optionally for mobile devices.

The terms "glass or glass-ceramic article in pane form" and "glass or glass-ceramic pane" are used synonymously in the context of the present disclosure.

The glass or glass-ceramic article in pane form has a thickness d of 300 μm to 1000 μm.

The thickness thereof is optionally not more than 650 μm.

It comprises a glass or glass-ceramic having a composition comprising the components $SiO_2$, $Al_2O_3$, $Li_2O$ and $Na_2O$. It optionally comprises an LAS glass or an LAS glass-ceramic.

The article is in chemically tempered form.

The chemically tempered glass or glass-ceramic article in pane form has a compressive strength at a distance of 30 μm from the surface of a main face. Compressive strength at a distance of 30 μm from the surface of a main face is referred to as $CS_{30}$. It is at least 60 MPa.

The chemically tempered glass or glass-ceramic article in pane form has a compressive strength at a distance of 50 μm from the surface of a main face. Compressive strength at a distance of 50 μm from the surface of a main face is referred to as $CS_{50}$.

Main faces are those faces of the glass or glass-ceramic pane that are the largest in terms of their area compared to the other faces. As well as the two main faces, a face optionally has four sides that connect the two main sides, which are called edge faces. In the case of non-rectangular-shaped faces, the pane may also have fewer edge faces, for example just one edge face. The transitions from main faces to edge faces are called edges. The inventive article in pane form may have an essentially rectangular shape. In particular, the glass or glass-ceramic pane may have eight vertices.

The glass or glass-ceramic pane has a length, a width and a thickness. The length generally corresponds to the greatest edge length of a main face, the width typically corresponds to the shortest edge length of a main face, and the thickness corresponds to the shortest distance between the two main faces of a pane. The main faces of the panes are especially arranged parallel to one another.

The compressive strengths $CS_{30}$ and $CS_{50}$ of the same main face are in the following relationship V to one another:

$$V = \frac{CS_{30}}{CS_{50}} \leq -0.0006 * d + 2,$$

with d=thickness of the glass article in μm.

The glass and glass-ceramic articles provided according to the invention thus have a strength profile with a particularly low ratio of $CS_{30}$ to $CS_{50}$. These values are significant in respect of the progression of the stress curve since $CS_{30}$ describes compressive strength close to the surface and $CS_{50}$ compressive strength in the vicinity of the depth of the compressive strength zone (DoCL). DoCL is optionally, and depending on the thickness of the article, in the range from 85 μm to 220 μm or even to 250 μm. The DoCL value of the article is optionally at least 19.0% of its thickness, optionally 21.0% of the thickness.

The effect of this low ratio $$V = \frac{CS_{30}}{CS_{50}}$$

is that particularly high strengths are achieved. The flat progression of the drop in strength from the surface into the interior, which is expressed by the value, possibly inhibits cracking and crack progression when stresses occur.

An exemplary ratio $$V = \frac{CS_{30}}{CS_{50}} \leq -0.0006 * d + 1.85.$$

The ratio $$\frac{CS_{30}}{CS_{50}}$$

is dependent on thickness. The value thereof decreases with increasing thickness. In the case of the glass and glass-ceramic articles provided according to the invention, this dependence on thickness is not very pronounced, since, even in the case of low thicknesses, these glass and glass-ceramic articles have relatively high $CS_{50}$ values and hence a relatively low $$\frac{CS_{30}}{CS_{50}}$$

ratio, such that even thin some embodiments, especially embodiments of max. 650 μm, have high strength.

The stated parameters of chemical tempering, $CS_{30}$, $CS_{50}$ and DoCL, can be determined by suitable measuring instruments, for example the SLP-1000 measuring instrument from the manufacturer Orihara Industrial Co., Ltd.

The upper limit in the thickness of the glass or glass-ceramic article in pane form is optionally 700 μm, optionally only 650 μm.

In the case of such thin panes, the increase in strength is particularly apparent by comparison with panes having a different strength profile.

The chemically tempered glass or glass-ceramic article in pane form optionally has a $CS_{30}$ of at least 80 MPa.

The chemically tempered glass or glass-ceramic article in pane form optionally has a $CS_{50}$ of at least 40 MPa.

The glass or glass-ceramic article comprising $SiO_2$, $Al_2O_3$, $Li_2O$ and $Na_2O$ is optionally implemented with a glass or glass-ceramic having the following components in mol %:

$Li_2O$ 5-15, optionally 6-12
$Al_2O_3$ 5-20, optionally 9-15
$SiO_2$ 50-78, optionally 50-75
$Na_2O$ 0.1-6, optionally 0.1-3, optionally 0.1-1.5
$B_2O_3$ 0-10
$K_2O$ 0-1, optionally >0-1
MgO 0-6 optionally 0.1-3
CaO 0-6
ZnO 0-2
$P_2O_5$ 0-2
$ZrO_2$ 0-2.

Particularly the low maximum content of $Na_2O$ of 6 mol % or only 3 mol % or even only 1.5 mol % is found to be advantageous here for the positive properties of the article provided according to the invention, especially for a high $CS_{50}$ value and hence a low ratio of $CS_{30}$ to $CS_{50}$.

In some embodiments with glass-comprising articles, an $SiO_2$ content of 55 mol % to 70 mol % may be preferable.

When $B_2O_3$ is present, optionally in some embodiments with glass-comprising articles and optionally with a minimum content of 2 mol %, this has a positive effect on fusibility. Contents exceeding 10 mol % can lead to low chemical stability and low absolute $CS_{30}$ and $CS_{50}$ values. Therefore, the $B_2O_3$ content is optionally limited to 10 mol %, optionally to 8 mol %.

In some embodiments with glass-ceramic-comprising articles, it may be preferable when the glass-ceramic is $B_2O_3$-free.

When $K_2O$ is present, this has a positive effect on fusibility. Moreover, $K_2O$ in the glass increases K diffusion and permits lower tempering (K-DoL) in the last tempering step. The $K_2O$ content is optionally limited to 1 mol %, since excessively high $K_2O$ contents have an adverse effect on K-induced tempering (KCS).

When MgO is present, optionally with a minimum content of 0.1 mol %, this has a positive effect on fusibility. Contents exceeding 6 mol % promote crystallization and are therefore optionally avoided.

When $P_2O_5$ is present, optionally in some embodiments with glass-comprising articles and optionally with a minimum content of 0.1 mol %, this has a positive effect on alkali diffusion in the glass. This may be advantageous since the duration of ion exchange can be shortened. The $P_2O_5$ content should optionally not exceed 2 mol %, optionally 1.5 mol %, since excessively high contents can lead to corrosion of the refractory material in glass production. In some embodiments with articles comprising glass-ceramic, it may be preferable when the glass-ceramic is $P_2O_5$-free.

When $ZrO_2$ is present, optionally with a minimum content of 0.1 mol %, this has a positive effect on the chemical stability of the glass. It additionally serves as a nucleator in glass-ceramics, which permits controlled ceramization/crystallization of the green glass. In high contents, however, $ZrO_2$ promotes devitrification. Therefore, the content thereof is optionally limited to 2 mol %, optionally to 1.5 mol % and, especially in the case embodiments with glass-comprising articles, optionally to 1.0 mol %.

In some embodiments, the glass or glass-ceramic article, or the glass or glass-ceramic encompassed by the glass or glass-ceramic article comprises $Y_2O_3$, $La_2O_3$ and/or $Nb_2O_5$ only in the form of unavoidable traces of in each case not more than 0.1 mol %.

In some embodiments, the glass or glass-ceramic may contain up to 2% by weight of customary refining agents such as $As_2O_3$, $Sb_2O_3$, $SnO_2$, $CeO_2$, halides, e.g. chlorides, or sulfur compounds.

Preference may be given—merely for reasons of environmental protection and occupational hygiene-to embodiments in which the glass or glass-ceramic of the glass or glass-ceramic pane is free or essentially free of $As_2O_3$ and/or $Sb_2O_3$. This is also true of other toxic or environmentally harmful components such as PbO, $TeO_2$, CdO, etc. What is meant by "essentially free" in the context of the present disclosure is that only contamination which is unavoidable in the case of a standard and economically customary procedure (for example by raw materials) is present. What is meant by "free of" in the context of the present disclosure is that these components are present only in traces, namely each in a content of at most 500 ppm, based on weight, optionally at most 100 ppm, based on weight.

The glass or glass-ceramic is also optionally, if the article is not to be used as a back cover, free or essentially free of coloring components, especially free of V205, CoO, NiO, $Cr_2O_3$ and/or CuO.

The tempered glass or glass-ceramic pane optionally has a coefficient of thermal expansion CTE(20° C.-300° C.) of at most $7.0*10^{-6}$/K.

The tempered glass pane optionally has a coefficient of thermal expansion CTE(20° C.-300° C.) of at least $3.5*10^{-6}$/K.

The tempered glass-ceramic pane optionally has a coefficient of thermal expansion CTE(20° C.-300° C.) of at least $0.05*10^{-6}$/K or of at least $0.5*10^{-6}$/K.

The glass encompassed by the glass article may be a green glass, i.e. a glass which is crystallizable in a controlled manner under particular conditions, or a glass that crystallizes in an uncontrolled manner under standard ceramization conditions.

The glass encompassed by the glass article optionally has a ratio of $(Al_2O_3+B_2O_3)/(Li_2O+Na_2O+K_2O)>1$. The oxide contents are in each case reported here in mol %. The value of >1 for this ratio leads to a highly crosslinked glass network having a small amount of oxygen division sites, which has a positive effect on mechanical stability. Optionally, $(Al_2O_3+B_2O_3)/(Li_2O+Na_2O+K_2O)<3$.

The glass encompassed by the glass article optionally has a ratio of $(Li_2O)/(Na_2O+K_2O)>3$. The oxide contents are each reported here in mol %. Such a large value for this ratio leads to high absolute $CS_{30}$ and $CS_{50}$ values after chemical tempering.

Optionally, the glass encompassed by the glass article includes $$Na_2O<1.5\% \text{ mol and/or}$$

$$3>(Al_2O_3+B_2O_3)/(Li_2O+Na_2O+K_2O)>1.4 \text{ and/or}$$

$$15>(B_2O_3+CaO)>7 \text{ and/or}$$

$$(CaO+MgO)/(Na_2O)>2.5.$$

Optionally, the glass article has a coefficient of expansion CTE(20° C.-300° C.)<5.5 $10^{-6}$/K.

In some embodiments, the glass-ceramic encompassed by the glass-ceramic article may take the form of a lithium aluminium silicate glass-ceramic, and optionally includes high quartz solid solution and/or keatite solid solution and/or lithium metasilicate and/or lithium disilicate.

It optionally has keatite solid solution as a crystal phase, optionally as a main crystal phase. Lithium aluminium silicate glass-ceramics are well known as material, which offers distinct benefits with regard to the production of the glass-ceramic. Formation of the glass-ceramic such that it comprises keatite solid solution as crystalline phase (or crystal phase) may also be advantageous because it has good temperability. The keatite or keatite solid solution crystal phase obviously has a crystal structure amenable to ion exchange, specifically one in which lithium is exchanged for sodium and/or sodium and/or lithium is exchanged for potassium.

The low thickness of the pane of 300 μm to 1000 μm may also be advantageous and is of even greater significance in the case of the glass-ceramic embodiments than in the case of the glass embodiments because not only a low weight of the pane but also high transmittances can be achieved in this way.

In some embodiments, the glass-ceramic comprises keatite or keatite solid solution as the main crystal phase, which means that more than 50% by volume of the crystal phases encompassed by the glass-ceramic are present with keatitic crystal structure. Optionally up to 98.5% by volume of the crystal phases encompassed by the glass-ceramic or even 100% by volume may be present with keatitic crystal structure, i.e. as keatite or keatite solid solution. However, it is also possible that the glass-ceramic also comprises secondary phases, for example nucleating agents in crystalline form.

In general, without restriction to a specific embodiment, it is possible in some embodiments for the glass-ceramic of the glass-ceramic pane to comprise the following components in mol % based on oxide:

| | |
|---|---|
| $SiO_2$ | 50-78, optionally 60-75 |
| $Al_2O_3$ | 5-20, optionally 9-15 |
| $Li_2O$ | 5-15, optionally 7-13 |

This is a silicatic glass-ceramic that has sufficiently good fusibility as glass and does not have a tendency to immediate and uncontrolled crystallization. In this general composition range, known lithium aluminium silicate glass-ceramics in particular are producible, which are well known, for example, with regard to melting and ceramization conditions. A lithium content in the glass-ceramic may also be advantageous because exchange of sodium and/or potassium for lithium is possible in this way.

A particular component of the glass-ceramic in some embodiments is $SnO_2$. $SnO_2$ can act as a refining agent, for example, in the melt, and then as nucleating agent in the glass-ceramic itself. The glass-ceramic of the glass-ceramic pane therefore optionally comprises $SnO_2$ in some embodiments, optionally to an extent of at most 2 mol %.

The components $ZrO_2$ and $TiO_2$ can also act as nucleating agents in the glass-ceramics in some embodiments. It has been found that nucleation and in particular the content of nucleating agents in the glass-ceramic and the ratio thereof to one another can be determining in respect of the formation of an only slightly colored silicatic glass-ceramic having good transmittance and low opacity. The glass-ceramic therefore comprises $TiO_2$ in some embodiments, optionally to an extent of at most 3 mol % of $TiO_2$.

A very efficient nucleating agent in the glass-ceramic in some embodiments is additionally also $ZrO_2$. The glass-ceramic in some embodiments therefore comprises $ZrO_2$, optionally to an extent of at most 3 mol %.

In some embodiments, the glass-ceramic of the glass-ceramic pane comprises crystal phases having a crystallite size of 120 nm or less. The crystallites encompassed by the glass-ceramic are optionally at most 90 nm or less.

The glass or glass-ceramic article provided according to the invention is optionally produced by at least two-stage ion exchange of the glass or glass-ceramic, where the potassium salt content of the exchange bath used in the last exchange step is higher than the potassium salt content of the exchange bath used in the preceding exchange step(s).

As a result, in the last exchange step, a high K-induced compressive strength is created close to the surface, which makes the article, especially the glass article, more resistant to the action of blunt or smooth surfaces (called "blunt-impact stresses").

In the case of glass-ceramic articles, a single-stage ion exchange of the glass-ceramic may also be sufficient.

The glass article provided according to the invention may optionally be produced in a process comprising:

- a fusion process
- and a subsequent hot forming operation
- an ion exchange with
  - a first ion exchange step for a duration of 1 hour to 10 hours at a temperature between 380° C. and 460° C. and with a composition of the exchange bath between at least 0% by weight and at most 50% by weight of potassium salt, especially $KNO_3$, and at most 100% by weight and at least 50% by weight of sodium salt, especially $NaNO_3$, and
  - a last ion exchange step for a duration of 0.5 hour to 5 hours at a temperature between 380° C. and 460° C. and with a composition of the exchange bath between at least 50% by weight and at most 100% by weight of potassium salt, especially $KNO_3$, and at most 50% by weight and at least 0% by weight of sodium salt, especially $NaNO_3$,
- optionally one or more further ion exchange steps between the first and last ion exchange steps,
- optionally in exchange baths with compositions that differ from those of the first and last ion exchange steps.

Customary hot forming processes such as drawing methods, e.g. float methods or downdraw methods, are possible. Also possible are block casting and sawing to wafers.

The glass-ceramic article provided according to the invention can optionally be produced in a process comprising:

- a melting process
- and a subsequent hot forming operation
- thermal treatment of the silicatic green glass, wherein at least one nucleation step and at least one ceramization step are conducted,
- an ion exchange with
  - a first ion exchange step for a duration of 1 hour to 10 hours at a temperature between 380° C. and 500° C. and with a composition of the exchange bath between at least 0% by weight and at most 50% by weight of potassium salt, especially $KNO_3$, and at most 100% by weight and at least 50% by weight of sodium salt, especially $NaNO_3$, and optionally a last ion exchange step for a duration of 0.2 hour to 5 hours at a temperature between 380° C. and 500° C. and with a composition of the exchange bath between at least 50% by weight and at most 100% by weight of potassium salt, especially $KNO_3$, and at most 50% by weight and at least 0% by weight of sodium salt, especially $NaNO_3$, optionally one or more further ion exchange steps between the first and last ion exchange steps, optionally in exchange baths with compositions that differ from those of the first and last ion exchange steps.

Customary hot forming processes such as drawing methods, e.g. float methods or downdraw methods, are possible. Also possible are block casting and sawing to wafers.

The at least one nucleation step mentioned in the thermal treatment optionally takes place in the temperature range from 650° C. to 850° C. and optionally for a duration of 5 min to 60 h.

The at least one ceramization step mentioned in the thermal treatment optionally takes place in the temperature range from 700° C. to 1100° C. and optionally for a duration of 3 min to 120 h.

The present disclosure therefore also relates generally to a glass or glass-ceramic article produced or producible in a process according to some embodiments.

The present disclosure further relates to the use of a glass or glass-ceramic article in some embodiments and/or produced in a method according to some embodiments as cover pane, optionally front pane, especially as cover pane, optionally front pane, in electronic devices, especially in electronic display devices, especially in mobile electronic display devices, for example in mobile touch panels and/or mobile digital display devices such as smartphones or smartwatches.

An exchange bath is understood to mean a salt melt, where this salt melt is used in an ion exchange method for a glass or a glass-ceramic or a glass or glass-ceramic article. In the context of the present disclosure, the terms "exchange bath" and "ion exchange bath" are used synonymously.

In general, salts in technical grade purity are used for exchange baths. This means that, in spite of the use of merely sodium nitrate, for example, as starting material for an exchange bath, certain contaminants may be included in the exchange bath. The exchange bath is a melt of a salt, i.e. for example of sodium nitrate, or of a mixture of salts, for example a mixture of a sodium salt and a potassium salt. The composition of the exchange bath is specified in such a form that it relates to the nominal composition of the exchange bath without taking account of any impurities present. If, therefore, reference is made to a 100% sodium nitrate melt in the context of the present disclosure, what this means is that the only raw material used was sodium nitrate. However, the actual sodium nitrate content of the exchange bath may differ and will indeed generally do so, since technical grade raw materials in particular have a certain proportion of contaminants. However, this will generally be less than 5% by weight, based on the total weight of the exchange bath, especially less than 1% by weight.

However, it is also possible, and may also be advantageous under particular circumstances, if particularly pure salts are used, i.e. salts are used not in technical grade purity but in analytical quality for example. This may be advantageous in particular when the intention is to temper a glass or glass-ceramic pane amenable to very selective ion exchange. Therefore, in an illustrative embodiment, it may be the case that salts having a 3n purity (99.9% pure, based on weight) are used, especially when only an exchange for a particular ion is intended. It is optionally possible, however, to use salts of technical grade purity since these are much less expensive than salts of high purity. The purity here is typically 2n, i.e. 99.5% for example, based on weight.

In a corresponding manner, in the case of exchange baths having a mixture of different salts, the nominal contents of these salts are specified without reference to contaminants resulting from technical grade starting materials. An exchange bath with 90% by weight of $KNO_3$ and 10% by weight of $NaNO_3$ may thus likewise have a low level of contamination that results from the raw materials and should generally be less than 5% by weight, based on the total weight of the exchange bath, especially less than 1% by weight.

The above details relating to the composition of the exchange bath are correspondingly applicable here.

Moreover, the composition of the exchange bath also varies in the course of ion exchange, since continued ion exchange results in migration of lithium ions in particular from the glass or glass-ceramic or the glass or glass-ceramic article into the exchange bath. However, such a change in the composition of the exchange bath by aging is likewise not taken into account in the present context, unless explicitly stated otherwise. Instead, in the context of the general disclosure, when specifying the composition of an exchange bath, the emphasis is on the nominal original composition.

An exemplary ion exchange method is an at least two-stage exchange. More than two exchange steps are possible, and may be advantageous for controlled establishment of particular strength profiles.

The potassium salt content in the exchange bath of the last exchange step is optionally higher than that in the exchange bath of the first exchange step, and in the case of more than two-stage exchange is optionally higher than that in the exchange baths of all preceding steps.

Thus, especially in the case of the low-sodium glass-ceramics and especially glasses outlined, corresponding compressive strength depths DoCL, in particular and depending on the thickness of the article, are between 85 and 250 μm or between 85 and 220 μm, and strength profiles having compressive strengths $CS_{30}$ and $CS_{50}$ are attained that satisfy the ratio $$V = \frac{CS_{30}}{CS_{50}} \leq -0.0006 * d + 2$$

and hence lead to a high strength.

An exemplary ratio $$V = \frac{CS_{30}}{CS_{50}} \leq -0.0006 * d + 1.85.$$

An exemplary ion exchange method comprises a first ion exchange step for a duration of 1 hour to 10 hours at a temperature between 380° C. and 460° C. and with a composition of the exchange bath between at least 0% by weight and at most 50% by weight of potassium salt, especially $KNO_3$, and at most 100% by weight and at least 50% by weight of sodium salt, especially $NaNO_3$. What is meant here by the figure of 0% by weight of potassium salt is that the ion exchange can take place not in a mixed salt bath but also in a pure sodium salt bath. However, preference may be given to mixed salt baths with >0% by weight of potassium salt and <100% by weight of sodium salt.

The exemplary ion exchange method comprises a last ion exchange step for a duration of 0.5 hour to 5 hours at a temperature between 380° C. and 460° C. and with a composition of the exchange bath between at least 50% by weight and at most 100% by weight of potassium salt, especially $KNO_3$, and at most 50% by weight and at least 0% by weight of sodium salt, especially $NaNO_3$. What is meant here by the figure of 0% by weight of sodium salt is that the ion exchange can take place not in a mixed salt bath but also in a pure potassium salt bath. However, preference may be given to mixed salt baths with >0% by weight of sodium salt and <100% by weight of potassium salt.

The exemplary ion exchange method optionally comprises, between the first and last ion exchange steps, one or more further ion exchange steps. This or these optionally take place in exchange baths with compositions different from those of the first and last ion exchange steps.

EXAMPLES

The invention is elucidated in detail hereinafter by examples.

The compositions of the glasses of the glass articles as examples of inventive glasses (working examples) and of comparative glasses (comparative examples) can be found in Table 1.

The materials listed in Table 1 were melted at temperatures and refined using raw materials customary in the glass industry. Castings of about 140 mm×100 mm×30 mm in size were cast and annealed in a lehr and cooled down to room temperature. The castings were used to prepare the test specimens for the measurement of the properties. For instance, test specimens having thicknesses between 500 μm and 700 μm were created by sawing and then polishing.

Example A is a comparative example. Examples B, C and D are working examples.

TABLE 1

| Composition [mol %] | B | C | D | A |
|---|---|---|---|---|
| $SiO_2$ | 69 | 69.4 | 69.7 | 65.1 |
| $Al_2O_3$ | 10.4 | 11.1 | 14.1 | 11.6 |
| $Li_2O$ | 8.4 | 9 | 9.4 | 10.3 |
| $Na_2O$ | 2.3 | 1.3 | 0.7 | 9.9 |
| $B_2O_3$ | 3.7 | 3.3 | | |
| $ZrO_2$ | 0.1 | 0.5 | 1 | 1.9 |
| CaO | 2.8 | 4.2 | | 0.1 |

TABLE 1-continued

| Composition [mol %] | B | C | D | A |
|---|---|---|---|---|
| $K_2O$ | 0.2 | 0.2 | 0.1 | 0.2 |
| MgO | 2 | 0.1 | 1.6 | 0.5 |
| $CeO_2$ | 0.1 | 0.3 | | 0.02 |
| $Nd_2O_3$ | | | 0.1 | |
| ZnO | 0.1 | 0.1 | 0.4 | 0.1 |
| $P_2O_5$ | 0.3 | 0.1 | 0.1 | 0.3 |
| $Fe_2O_3$ | | | | |
| $TiO_2$ | | | 1.3 | |
| SrO | 0.2 | 0.3 | | |
| $SnO_2$ | 0.1 | 0.1 | 0.2 | |
| $SO_3$ | | | | 0.02 |
| Cl | 0.3 | | 1.3 | |

Samples of different thicknesses from the examples from Table 1 were subjected to chemical tempering under various tempering conditions listed in Table 2.

IOX1 here represents the first ion exchange step in a first exchange bath, and IOX2 the second ion exchange step in a second exchange bath.

The respective tempering times t are reported in hours [h], the respective tempering temperatures T in ° C. The respective $KNO_3$ and $NaNO_3$ contents of the exchange baths are reported in % by weight.

TABLE 2

| Sample | Ex. from Tab. 1 | Thickness [μm] | IOX1 t[h] | IOX1 T[° C.] | IOX1 $KNO_3$ [% by wt.] | IOX1 $NaNO_3$ [% by wt.] | IOX2 t[h] | IOX2 T[° C.] | IOX2 $KNO_3$ [% by wt.] | IOX2 $NaNO_3$ [% by wt.] |
|---|---|---|---|---|---|---|---|---|---|---|
| A1 | A | 500 | 4 | 395 | 50 | 50 | 3 | 380 | 92 | 8 |
| A2 | A | 550 | 3 | 395 | 50 | 50 | 3 | 380 | 92 | 8 |
| A3 | A | 600 | 4 | 395 | 50 | 50 | 3 | 380 | 92 | 8 |
| A4 | A | 700 | 4 | 395 | 50 | 50 | 3 | 380 | 92 | 8 |
| B1 | B | 530 | 6 | 410 | 20 | 80 | 3 | 390 | 100 | 0 |
| B2 | B | 550 | 5 | 420 | 20 | 80 | 3 | 400 | 100 | 0 |
| B3 | B | 580 | 6 | 410 | 20 | 80 | 3 | 390 | 100 | 0 |
| B4 | B | 630 | 6 | 410 | 20 | 80 | 3 | 390 | 100 | 0 |
| B5 | B | 680 | 6 | 410 | 20 | 80 | 3 | 390 | 100 | 0 |
| B6 | B | 700 | 8 | 420 | 20 | 80 | 3 | 400 | 100 | 0 |
| C1 | C | 502 | 6 | 420 | 0 | 100 | 3 | 410 | 100 | 0 |
| C2 | C | 700 | 7.5 | 420 | 20 | 80 | 3 | 400 | 100 | 0 |
| D1 | D | 504 | 2.5 | 440 | 0 | 100 | 2 | 420 | 100 | 0 |
| D2 | D | 610 | 5 | 410 | 20 | 80 | 3 | 390 | 100 | 0 |
| D3 | D | 694 | 4 | 450 | 0.1 | 99.9 | 2 | 440 | 100 | 0 |

The results of the chemical tempering according to Table 2 are listed in Table 3. This reports the following: compressive strength at a distance of 30 μm from the surface of a main face: $CS_{30}$, reported in MPa, compressive strength at a distance of 50 μm from the surface of the same main face: $CS_{50}$, reported in MPa, the dimensionless ratio $CS_{30}/CS_{50}$ and the depth of the compressive strength zone of the same main face: DoCL, reported in μm.

The values of $CS_{30}$ and $CS_{50}$ are given in rounded form in the table; therefore, apparent variances occur in some cases from the reported C3/C50 values.

TABLE 3

| Sample from Tab. 2 | Thickness [μm] | $CS_{30}$ [MPa] | $CS_{50}$ [MPa] | $CS_{30}/CS_{50}$ | DoCL [μm] |
|---|---|---|---|---|---|
| A1 | 500 | 111 | 60 | 1.85 | 90 |
| A2 | 550 | 135 | 74 | 1.82 | 103 |

TABLE 3-continued

| Sample from Tab. 2 | Thickness [μm] | $CS_{30}$ [MPa] | $CS_{50}$ [MPa] | $CS_{30}/CS_{50}$ | DoCL [μm] |
|---|---|---|---|---|---|
| A3 | 600 | 136 | 80 | 1.71 | 108 |
| A4 | 700 | 160 | 96 | 1.67 | 121 |
| B1 | 530 | 91 | 68 | 1.32 | 120 |
| B2 | 550 | 106 | 81 | 1.31 | 123 |
| B3 | 580 | 100 | 77 | 1.29 | 127 |
| B4 | 630 | 113 | 90 | 1.25 | 142 |
| B5 | 680 | 116 | 95 | 1.22 | 152 |
| B6 | 700 | 117 | 95 | 1.23 | 147 |
| C1 | 502 | 137 | 99 | 1.39 | 107 |
| C2 | 700 | 173 | 135 | 1.28 | 136 |
| D1 | 504 | 100 | 71 | 1.42 | 108 |
| D2 | 610 | 158 | 127 | 1.24 | 149 |
| D3 | 694 | 84 | 71 | 1.19 | 158 |

FIG. 1 shows data from Table 3 in the form of a graph, p on the x axis is the respective thickness of the glass samples in μm and plotted on the y axis is the respective ratio $$V = \frac{CS_{30}}{CS_{50}}.$$

In addition to the individual measurement points, the line $$V = \frac{CS_{30}}{CS_{50}} = -0.0006 * d + 2$$

is shown. It separates the inventive embodiments with $$V = \frac{CS_{30}}{CS_{50}} \leq -0.0006 * d + 2$$

from those with $$V = \frac{CS_{30}}{CS_{50}} > -0.0006 * d + 2.$$

Figure 2:
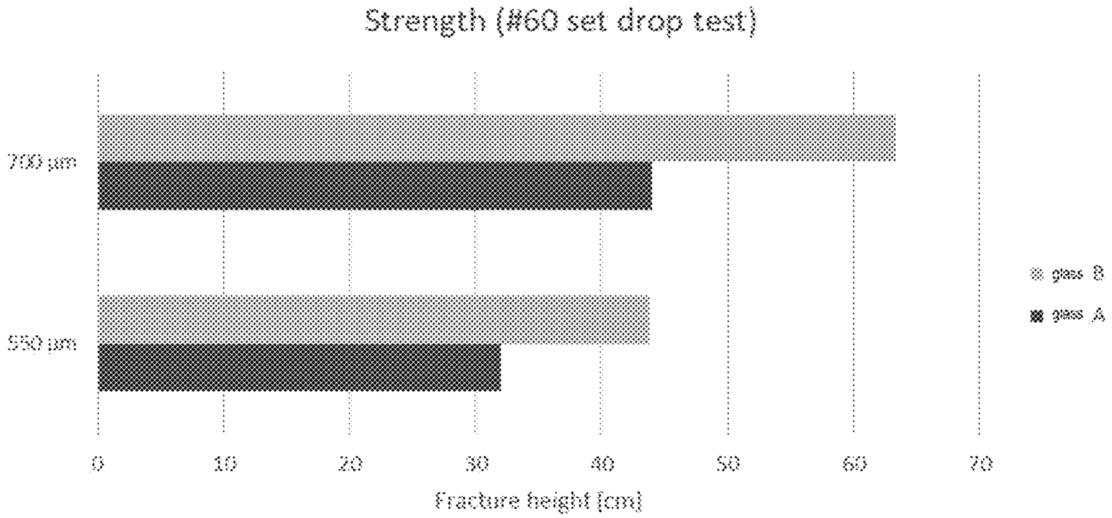
FIG. 2 describes the test results from a set drop test as a measure of strength.

The fact that this ratio is essential to the improved strength of the glass and glass-ceramic panes according to the invention is shown by FIG. 2.

FIG. 2 describes the test results from a set drop test as a measure of strength. The test was conducted with a grain size of 60, which is a comparatively large grain size and places particularly high demands on the materials tested. Tempered samples with composition B having two different thicknesses, namely 550 μm and 700 μm, i.e. samples B2 and B6, were compared with tempered samples having composition A with the same two thicknesses, i.e. samples A2 and A4.

FIGS. 3 to 6 relate to the performance of what is called the set drop test for determination of set drop resistance.

Figure 3:
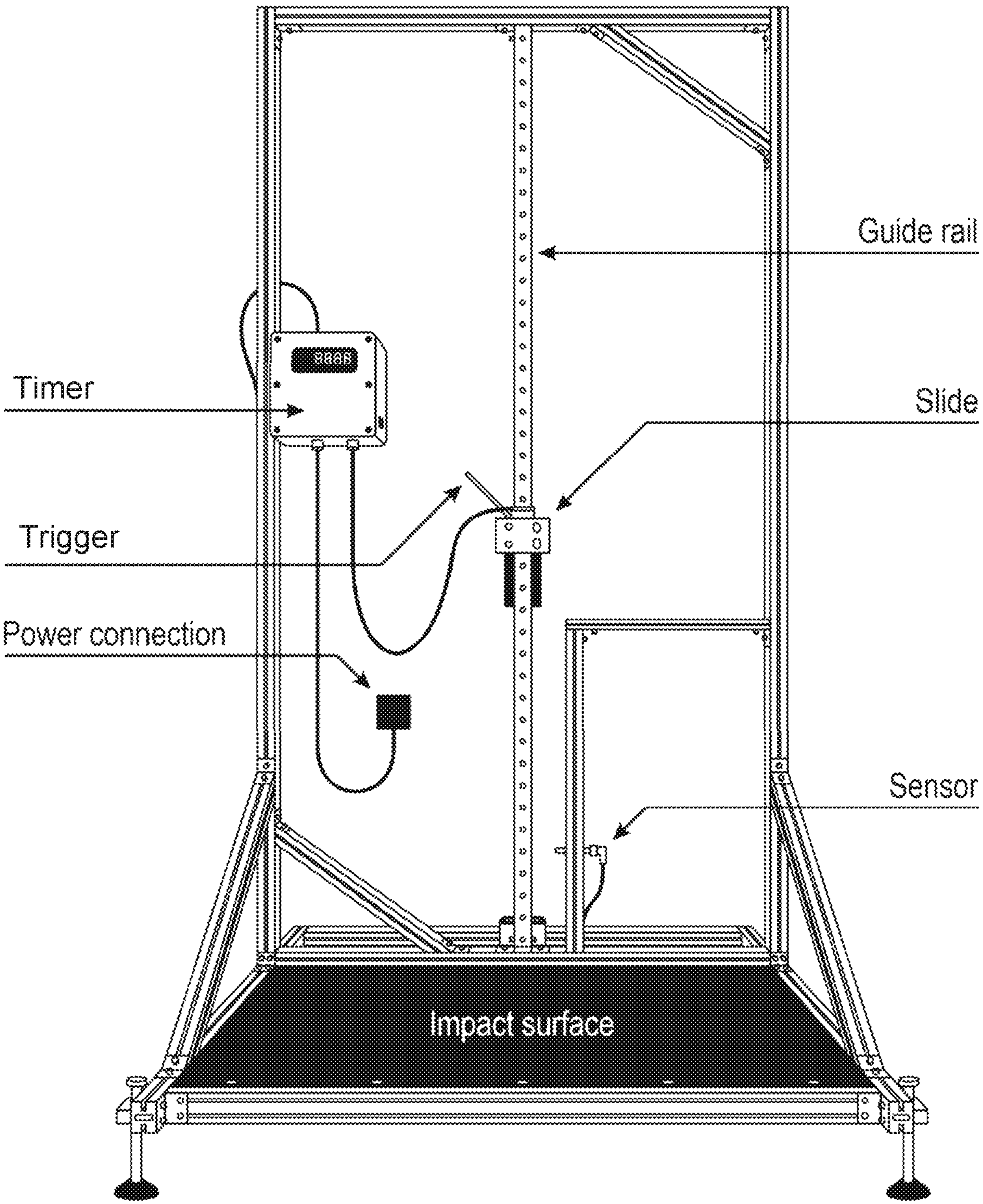
FIG. 3 is a photograph of an overall view of a set drop test setup with labelling of the individual components.
Figure 4A:
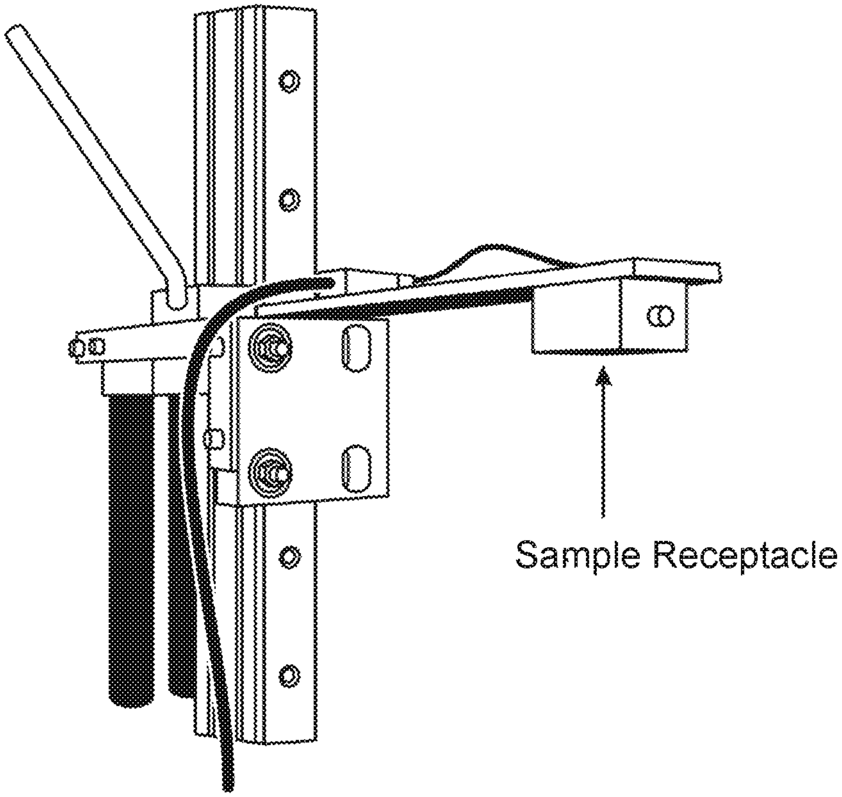
FIGS. 4A and 4B show a sample receptacle (FIG. 4B) and trigger mechanism (FIG. 4A) of the set drop test setup of FIG. 3.
Figure 4B:
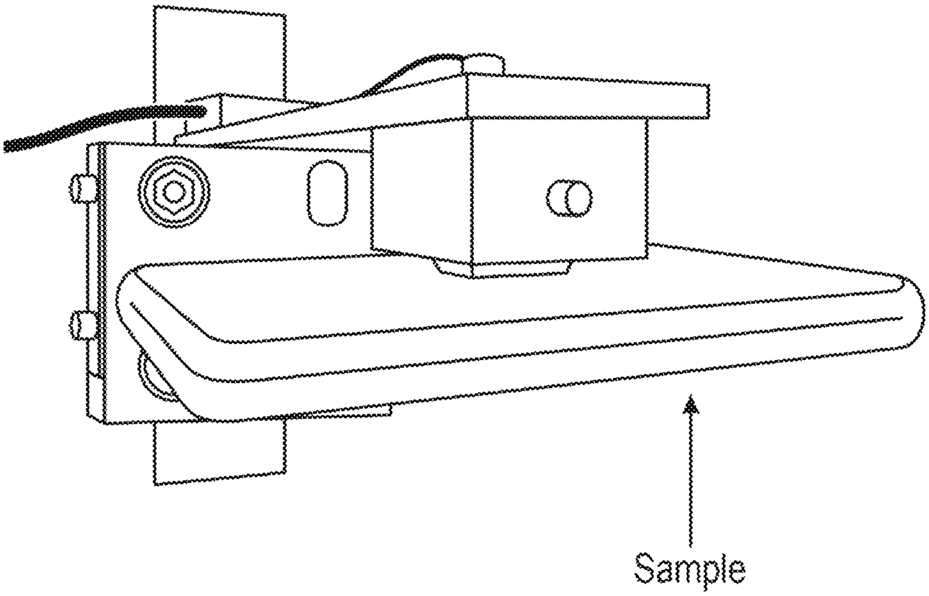
Figure 5:
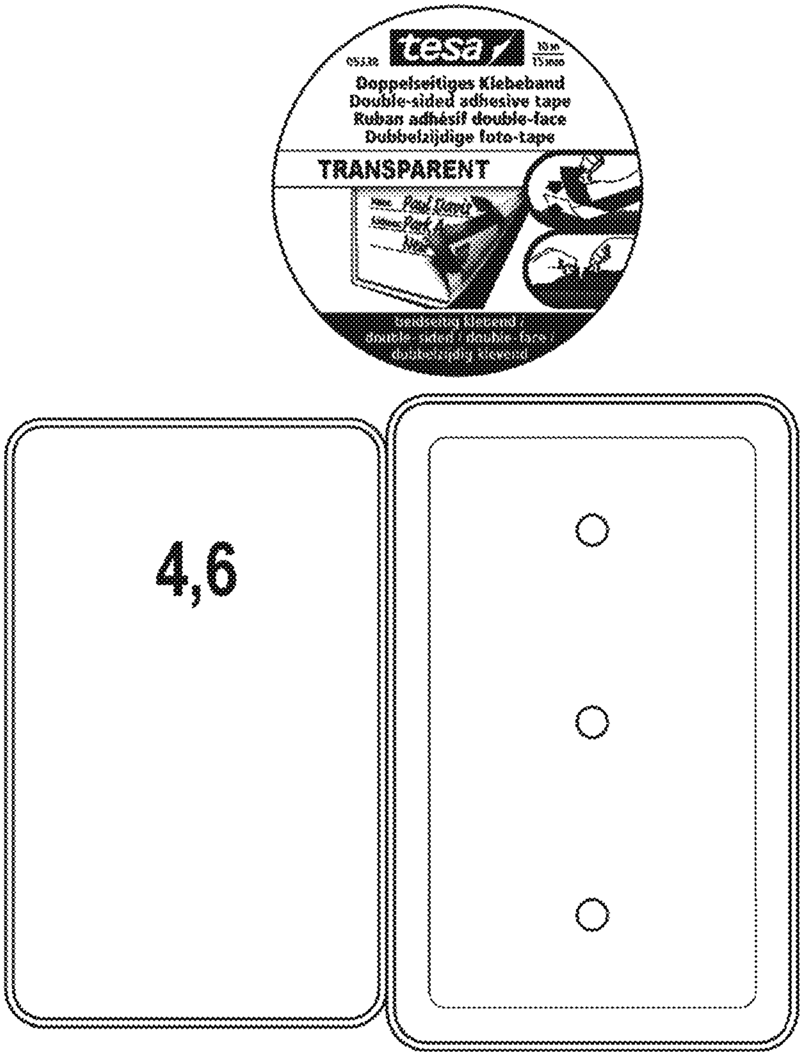
FIG. 5 shows an aluminum housing and plastic sheet as sample receptacle and sample dummy.
Figure 6:
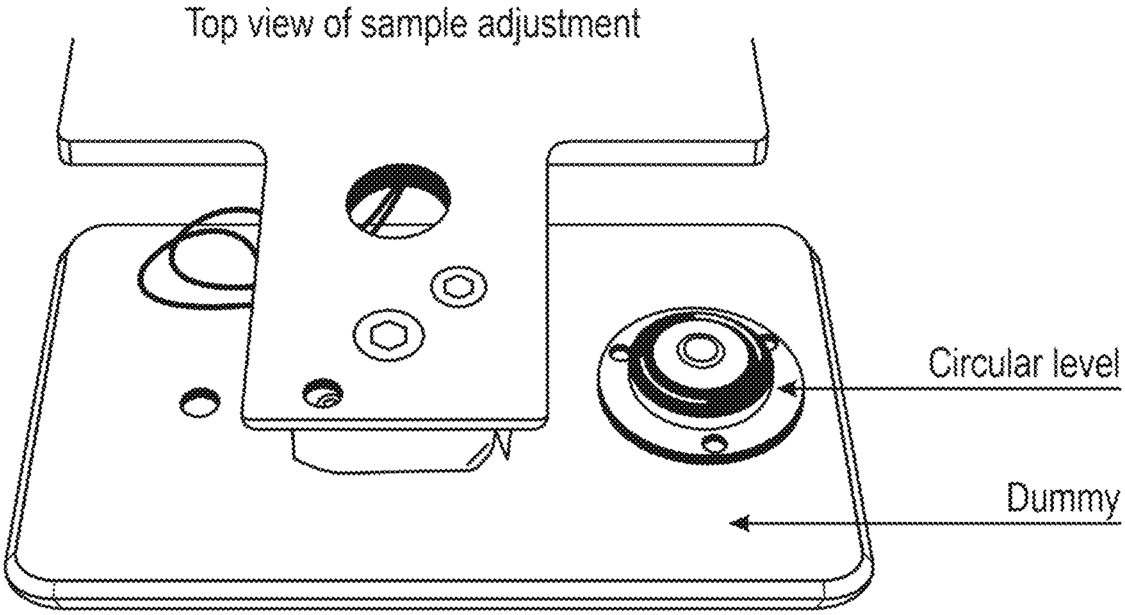
FIG. 6 shows alignment of the sample dummy in the sample receptacle using 2-dimensional water level.

The set drop test is optionally conducted as follows:

A pane is fixed on a sample receptacle and allowed to fall from accumulating drop heights onto a defined floor. An overview of the overall structure is shown in FIG. 3. The pane used in the set drop test in FIG. 5 has a length of 99 mm and a width of 59 mm, and, as shown in FIGS. 4A and 4B, is fixed magnetically with a sample dummy in the sample receptacle.

First of all, a polymer sheet is stuck with the aid of double-sided adhesive tape into a metal housing having the shape and weight of a holder for an ultimate mobile device, for example a smartphone. Suitable plastic sheets here are for example those having thicknesses between 4.35 mm and 4.6 mm (see FIG. 5). They are optionally stuck in by means of a double-sided adhesive tape having a thickness of about 100 μm. Then, by means of a double-sided adhesive tape, optionally a double-sided adhesive tape of thickness 295 μm, especially a double-sided adhesive tape of the Tesa® brand, product number 05338, the glass article to be tested in the form of a pane is stuck onto the plastic sheet in such a way that a distance between 350 μm and 450 μm is obtained between the top edge of the housing/holder and the top edge of the glass article. The cover pane lies higher than the housing frame, and there must be no occurrence of direct contact between cover pane and aluminium housing. The set thus obtained, which simulates the incorporation of a cover pane into an ultimate mobile device and is a kind of dummy for a real ultimate mobile device, a smartphone here in particular, is subsequently allowed to drop downward onto an area of DIN A4 size, called the impact area, by the glass side with an initial speed in vertical direction, and hence a fall direction of zero. The impact area is produced here as follows: sandpaper with an appropriate grain size, for example grain size 60 (#60), is stuck onto a baseplate by means of a double-sided adhesive tape, for example an adhesive tape of thickness 100 μm. The adhesive tape used was Tesa (10m/15 mm), transparent, double-sided, product number 05338. Grain size in the context of the present disclosure is defined according to the standards of the Federation of European Producers of Abrasives (FEPA); for examples thereof see also DIN ISO 6344, especially DIN ISO 6344-2:2000-04, Coated abrasives-Grain size analysis-Part 2: Determination of grain size distribution of macrogrits P 12 to P 220 (ISO 6344-2:1998). The weight of the baseplate, which, with the values disclosed in the present context, is an aluminium base, is about 3 kg.

The baseplate must be firm and is optionally formed from aluminium or else alternatively from steel. The sandpaper must be completely covered with adhesive tape and stuck down without bubbles. The impact surface must be used only for five drop tests and should be exchanged after the fifth drop test. The sample, i.e. the set obtained, is inserted into the test apparatus and aligned by means of a 2D water level (circular level) such that the set is horizontal, with the cover pane facing the floor, i.e. in the direction of the impact area (see FIG. 6). The first drop height is 20 cm; if no breakage occurs, the drop height is increased in 10 cm steps until glass breakage occurs. The test is conducted on 10 to 15 samples, and an average breakage height is formed.

The set drop test in respect of an article is generally a measure of its strength, especially for what is called the sharp impact strength. It simulates the falling of the article, especially of a pane, onto a rough surface on which a multitude of small sharp articles (for example grains of sand on asphalt, concrete or sandpaper) can penetrate into the pane to be tested.

FIG. 2 shows that working example B at both sample thicknesses has a higher breakage height than comparative example A, i.e. a higher set drop strength.

This improvement is highly advantageous for the everyday usability of cover panes in ultimate mobile devices, especially in mobile electronic display devices, for example in mobile touch panels and/or mobile digital display devices such as smartphones or smartwatches.

The ratio $$V = \frac{CS_{30}}{CS_{50}} \leq -0.0006 * d + 2$$

is thus a measure of the strength of the tempered glass or glass-ceramic article. Determination and knowledge of these parameters thus enables the selection of suitable materials without having to conduct a complex measurement of strength with statistical evaluation of the results like a set drop test. This greatly facilitates experimental work specifically in the case of considerable variation in the tempering conditions and the resulting number of samples. The disclosure thus also encompasses a process for determining the suitability of a tempered glass or glass-ceramic pane for use as cover pane.

The invention provides, with the tempered glass and glass-ceramic articles in pane form that satisfy $$V = \frac{CS_{30}}{CS_{50}} \leq -0.0006 * d + 2,$$

glass and glass-ceramic panes which, because of their improved strength, show high everyday usability and hence particular suitability as cover panes in ultimate mobile devices.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A chemically tempered glass or glass-ceramic article in pane form for use as a cover pane, comprising:

a glass or glass-ceramic having a composition comprising the components $SiO_2$, $Al_2O_3$, $Li_2O$ and $Na_2O$, having a thickness d of 300 µm to 1000 µm, a compressive strength at a distance of 30 µm from a surface of a main face $CS_{30}$ of at least 60 MPa, and a compressive strength at a distance of 50 µm from the surface of a main face $CS_{50}$, wherein the compressive strengths $CS_{30}$ and $CS_{50}$ of the same main face are in the following ratio V to one another:

$$V = \frac{CS_{30}}{CS_{50}} \leq -0.0006 * d + 2,$$

wherein d=the thickness of the article in µm, wherein the composition comprises the following components in mol %:

$Li_2O$ 6-12;
$Al_2O_3$ 9-15;
$SiO_2$ 50-75;
$Na_2O$ 0.1-3;
$B_2O_3$ 0-10;
$K_2O$>0-1;
MgO 0.1-3;
CaO 0-6;
ZnO 0-2;
$P_2O_5$ 0-2; and
$ZrO_2$ 0-2.

2. The glass or glass-ceramic article of claim 1, wherein $CS_{30}$ is at least 80 MPa and/or $CS_{50}$ is at least 40 MPa.

3. The glass or glass-ceramic article of claim 1, wherein the thickness is not more than 700 µm.

4. The glass or glass-ceramic article of claim 1, characterized by a coefficient of thermal expansion CTE (20° C.-300° C.) of not more than $7.0*10^{-6}$/K.

5. The glass or glass-ceramic article of claim 1, characterized by a coefficient of thermal expansion CTE (20° C.-300° C.) of at least $3.5*10^{-6}$/K.

6. The glass or glass-ceramic article of claim 1, wherein in the at least two-stage ion exchange production of the glass or glass-ceramic, a potassium salt content of an exchange bath used in a last exchange step is higher than the potassium salt content of one or more dip baths used in the preceding exchange step(s).

7. The glass or glass-ceramic article of claim 6, wherein the ion exchange comprises the following steps:

a first ion exchange step for a duration of 1 hour to 10 hours at a temperature between 380° C. and 460° C. in the case of a glass article and between 380° C. and 500° C. in the case of a glass-ceramic article and with a composition of the exchange bath between at least 0% by weight and at most 50% by weight of potassium salt and at most 100% by weight and at least 50% by weight of sodium salt; and a last ion exchange step for a duration of 0.5 hour to 5 hours in the case of a glass article and of 0.2 hour to 5 hours in the case of a glass-ceramic article at a temperature between 380° C. and 460° C. in the case of a glass article and between 380° C. and 500° C. in the case of a glass-ceramic article, and with a composition of the exchange bath between at least 50% by weight and at most 100% by weight of potassium salt and at most 50% by weight to at least 0% by weight of sodium salt.

8. A process for producing a glass or glass-ceramic article from a glass or glass-ceramic, comprising:

performing a plurality of ion exchanges of the glass or glass-ceramic, the plurality of ion exchanges comprising:

a first ion exchange in a first exchange bath for a duration of 1 hour to 10 hours at a temperature between 380° C. and 460° C. in the case of a glass article and between 380° C. and 500° C. in the case of a glass-ceramic article, the first exchange bath having a composition between at least 0% by weight and at most 50% by weight of potassium salt and at most 100% by weight and at least 50% by weight of sodium salt; and a last ion exchange in a last exchange bath for a duration of 0.5 hour to 5 hours in the case of a glass article and of 0.2 hour to 5 hours in the case of a glass-ceramic article at a temperature between 380° C. and 460° C. in the case of a glass article and between 380° C. and 500° C. in the case of a glass-ceramic article, the last exchange bath having a composition between at least 50% by weight and at most 100% by weight of potassium salt and at most 50% by weight and at least 0% by weight of sodium salt.

9. The process of claim 8, wherein the plurality of ion exchanges comprises one or more further ion exchanges of the glass or glass-ceramic between the first ion exchange and the last ion exchange.

10. The process of claim 9, wherein the one or more further ion exchanges take place in at least one exchange bath with a composition that differs from the composition of the first exchange bath and the composition of the last exchange bath.

11. The process of claim 8, wherein the potassium salt of the first exchange bath and/or the last exchange bath comprises $KNO_3$ and/or the sodium salt of the first exchange bath and/or the last exchange bath comprises $NaNO_3$.

* * * * *